(12) United States Patent
Grundvig et al.

(10) Patent No.: US 8,456,775 B2
(45) Date of Patent: Jun. 4, 2013

(54) SYSTEMS AND METHODS FOR DETECTING A REFERENCE PATTERN

(75) Inventors: Jeffery Grundvig, Loveland, CO (US); Viswanath Annampedu, Schnecksville, PA (US); Jason Byrne, Lyons, CO (US); Keith Bloss, Schnecksville, PA (US)

(73) Assignee: LSI Corporation, San Jose, CA (US)

( * ) Notice: Subject to any disclaimer, the term of this patent is extended or adjusted under 35 U.S.C. 154(b) by 688 days.

(21) Appl. No.: 12/651,280

(22) Filed: Dec. 31, 2009

(65) Prior Publication Data

US 2011/0157737 A1    Jun. 30, 2011

(51) Int. Cl.
  *G11B 5/09* (2006.01)
(52) U.S. Cl.
  USPC ............. 360/51; 360/25; 360/26; 360/48; 360/53; 360/65
(58) Field of Classification Search
  None
  See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,986,830 A | 11/1999 | Hein | |
| 5,987,562 A | 11/1999 | Glover | |
| 6,009,549 A | 12/1999 | Bliss et al. | |
| 6,014,276 A * | 1/2000 | Takase | 360/49 |
| 6,023,383 A | 2/2000 | Glover et al. | |
| 6,069,583 A | 5/2000 | Silvestrin et al. | |
| 6,081,397 A | 6/2000 | Belser | |
| 6,111,712 A | 8/2000 | Vishakhadatta et al. | |
| 6,185,716 B1 * | 2/2001 | Riggle | 714/769 |
| 6,208,478 B1 | 3/2001 | Chiu et al. | |
| 6,262,861 B1 * | 7/2001 | Kosugi | 360/78.14 |
| 6,278,591 B1 | 8/2001 | Chang et al. | |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Dismery Mercedes
(74) *Attorney, Agent, or Firm* — Hamilton DeSanctis and Cha

(57) ABSTRACT

Various embodiments of the present invention provide systems and methods for locating a reference pattern on a storage medium. For example, various embodiments of the present invention provide systems for locating a reference pattern on a storage medium. Such systems include a sliding window phase calculator circuit, a delay circuit and a mark detector circuit.

18 Claims, 8 Drawing Sheets

U.S. PATENT DOCUMENTS

| | | | |
|---|---|---|---|
| 6,400,518 B1 | 6/2002 | Bhaumik et al. | |
| 6,404,829 B1 | 6/2002 | Sonu | |
| 6,441,661 B1 | 8/2002 | Aoki et al. | |
| 6,490,110 B2 * | 12/2002 | Reed et al. | 360/48 |
| 6,493,162 B1 | 12/2002 | Fredrickson | |
| 6,519,102 B1 | 2/2003 | Smith | |
| 6,530,060 B1 | 3/2003 | Vis et al. | |
| 6,532,567 B2 * | 3/2003 | Ino | 714/798 |
| 6,603,622 B1 | 8/2003 | Christiansen et al. | |
| 6,606,048 B1 | 8/2003 | Sutardja | |
| 6,614,609 B1 * | 9/2003 | Reed et al. | 360/51 |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,662,303 B1 * | 12/2003 | Toosky et al. | 713/400 |
| 6,738,205 B1 * | 5/2004 | Moran et al. | 360/17 |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,767 B2 * | 2/2006 | Annampedu et al. | 360/75 |
| 7,038,875 B2 | 5/2006 | Lou et al. | |
| 7,072,137 B2 | 7/2006 | Chiba | |
| 7,082,005 B2 | 7/2006 | Annampedu et al. | |
| 7,092,462 B2 * | 8/2006 | Annampedu et al. | 375/340 |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,253,984 B1 | 8/2007 | Patapoutian et al. | |
| 7,253,985 B1 * | 8/2007 | Gami et al. | 360/75 |
| 7,301,717 B1 | 11/2007 | Lee et al. | |
| 7,308,057 B1 | 12/2007 | Patapoutian | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,238 B2 | 3/2009 | Annampedu | |
| 7,620,101 B1 | 11/2009 | Jenkins | |
| 7,783,950 B2 * | 8/2010 | Esumi et al. | 714/752 |
| 8,000,050 B2 * | 8/2011 | Kanaoka et al. | 360/51 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0095350 A1 | 5/2003 | Annampedu et al. | |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0071152 A1 | 3/2007 | Chen et al. | |
| 2007/0104300 A1 | 5/2007 | Esumi et al. | |
| 2007/0183073 A1 * | 8/2007 | Sutardja et al. | 360/51 |
| 2007/0230015 A1 | 10/2007 | Yamashita | |
| 2007/0253084 A1 * | 11/2007 | Annampedu et al. | 360/39 |
| 2007/0263311 A1 | 11/2007 | Smith | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park et al. | |
| 2009/0052075 A1 * | 2/2009 | Annampedu | 360/51 |
| 2009/0142620 A1 | 6/2009 | Yamamoto et al. | |

OTHER PUBLICATIONS

Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

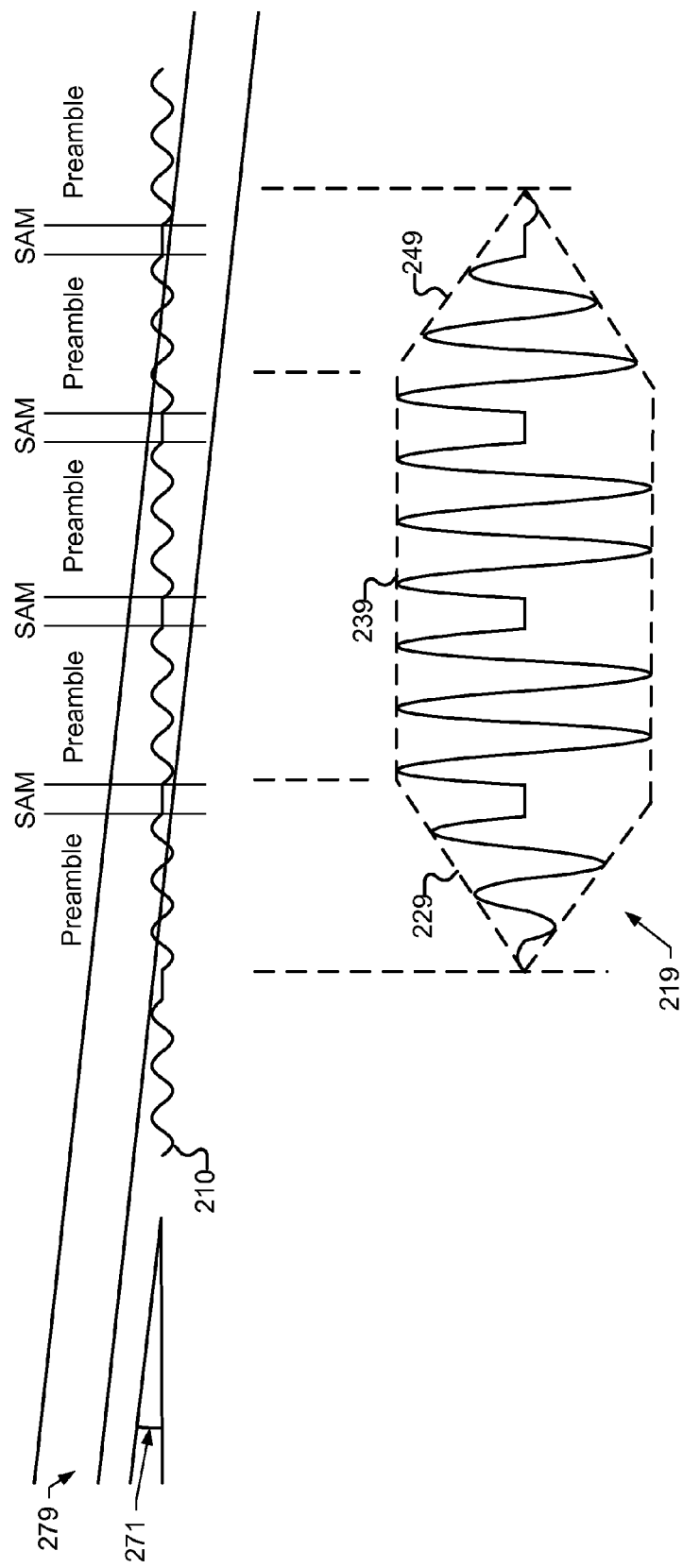

SYSTEMS AND METHODS FOR DETECTING A REFERENCE PATTERN

BACKGROUND OF THE INVENTION

The present inventions are related to storage media, and more particularly to systems and methods for preparing servo data on a storage medium.

A typical digital magnetic storage medium includes a number of storage locations where digital data may be stored. Data is written to the medium by positioning a read/write head assembly over the medium at a selected location, and subsequently passing a modulated electric current through the head assembly such that a corresponding magnetic flux pattern is induced in the storage medium. To retrieve the stored data, the head assembly is positioned anew over the track. In this position, the previously stored magnetic flux pattern induces a current in the head assembly that can be converted to the previously recorded digital data.

The storage locations on the magnetic storage medium are typically arranged as a serial pattern along concentric circles known as tracks. FIG. 1 shows a storage medium 100 with two exemplary tracks 150, 155 as dashed lines. The tracks are segregated by servo data written within wedges 160, 165. These wedges include data and supporting bit patterns that are used for control and synchronization of the head assembly over a desired storage location on storage medium 100. The data and supporting bit patterns used to derive the control and synchronization is depicted as a pattern 110 that includes a preamble 152, a sync 154, a gray code 156 and a burst 158. It should be noted that while two tracks and two wedges are shown, hundreds of each would typically be included on a given storage medium.

Traditionally, the servo data within wedges 160, 165 has been written by an external servo writer which is costly both in terms of equipment and time. In some cases, disk drive manufacturers have utilized the read/write head assembly to write the servo data using a process known as self servo writing. As one example of this process, an external writer is used to write servo data for only a limited number a tracks at an outer edge 190 of storage medium 100. Using this as a guide, the head assembly can then be used to write the servo data corresponding to the inner tracks. As another example, a reference pattern is applied more generally to storage medium 100 in a known way, but not corresponding directly to wedges 160, 165. While both approaches offer viable alternatives to the traditional approach, each requires additional capability for positioning the head assembly.

Hence, for at least the aforementioned reasons, there exists a need in the art for advanced systems and methods for head assembly positioning during self servo writing.

BRIEF SUMMARY OF THE INVENTION

The present inventions are related to storage media, and more particularly to systems and methods for preparing servo data on a storage medium.

Various embodiments of the present invention provide systems for locating a reference pattern on a storage medium. Such systems include a sliding window phase calculator circuit, a delay circuit and a mark detector circuit. The sliding window phase calculator circuit is operable to receive a series of digital samples corresponding to a reference pattern that includes a periodic pattern and a mark pattern. The sliding window phase calculator circuit is operable to determine a phase select output based at least in part on samples of the periodic pattern included in a subset of the series of digital samples. The length of the sliding window corresponds to the number of digital samples included in the subset of the series of digital samples. The delay circuit is operable to delay the series of digital samples and to provide a series of delayed samples. The mark detector circuit interpolates the series of delayed samples using the phase select output to yield a series of interpolated samples, and to query the series of interpolated samples for the mark pattern.

In some instances of the aforementioned embodiments, the sliding window phase calculator circuit includes a discrete Fourier transform circuit that is operable to transfer the subset of the series of digital samples from the time domain to the frequency domain. In various instances of the aforementioned embodiments, the delay imposed by the delay circuit is approximately one half of the number of periods corresponding to the number of samples in the subset of the series of digital samples. In other instances of the aforementioned embodiments, the delay imposed by the delay circuit is exactly one half of the number of periods corresponding to the number of samples in the subset of the series of digital samples.

In some instances of the aforementioned embodiments, the subset of the series of digital samples is a first subset of the series of digital samples. In such instances, the system may further include a threshold detection circuit that is operable to assert an enable signal when a second subset of the series of digital samples exceeds a threshold value, and the mark detector circuit is further operable to provide a location mark when the mark pattern is detected and the enable signal is asserted. In particular cases, the threshold detection circuit is an envelope detector circuit.

Other embodiments of the present invention provide methods for determining a location of a reference pattern on a storage medium. Such methods include receiving a series of digital samples corresponding to a reference pattern on a medium; performing a discrete Fourier transform on a subset of the series of digital samples to yield a phase of the periodic pattern; interpolating a subset of the series digital samples using the phase of the periodic pattern to yield an interpolated series of digital samples; and searching the interpolated series of digital samples for the mark pattern. A location of the detected mark pattern is identified the mark pattern is detected.

In various instances of the aforementioned embodiments, the interpolated series of digital samples is a first interpolated series of digital samples, the subset of the series of digital samples are defined by a window of a defined length, the subset of the series of digital samples is a first subset of the series of digital samples. In such instances, the methods further include adding an additional digital sample to the series of digital samples; sliding the window across the series of digital samples to yield a second subset of the series of digital samples that includes the additional digital sample; performing the discrete Fourier transform on the second subset of the series of digital samples to yield the phase of the periodic pattern; interpolating the second subset of the series digital samples using the phase of the periodic pattern to yield a second interpolated series of digital samples; and searching the second interpolated series of digital samples for the mark pattern. In particular instances, the aforementioned window includes the forty most recent instances of the series of digital samples.

In one or more instances of the aforementioned embodiments, the subset of the series of digital samples are defined by a window of a defined length, and the subset of the series of digital samples is a first subset of the series of digital samples. In such instances, the method further includes adding an additional digital sample to the series of digital samples; sliding the window across the series of digital samples to yield a second subset of the series of digital samples that includes the additional digital sample; summing the absolute values of each of the second subset of digital samples to yield a sum of samples; and comparing a derivative of the sum of samples with a threshold value. An enable signal is asserted when the sum of samples exceeds the threshold value. In some cases, the location of the detected mark pattern is provided when the enable signal is asserted.

In other instances of the aforementioned embodiments, the location of the detected mark pattern is detected a number of periods after the series of digital samples surrounding the mark pattern are used to perform the discrete Fourier transform. In some cases, the number of periods corresponds to approximately one half of the length of the window. In particular cases, the number of periods corresponds to exactly one half of the length of the window. In some cases, the location of the detected mark pattern is provided to a servo write control circuit operable to write servo data on the medium. In such cases, the servo data is written to the storage medium at a location a defined distance from the location of the detected mark pattern.

Yet other embodiments of the present invention provide storage systems that include a storage medium including a reference pattern having a periodic pattern and a mark pattern, a read/write head assembly disposed in relation to the storage medium, an analog to digital conversion circuit, and a location detector circuit. The analog to digital conversion circuit is operable to receive an electrical signal corresponding to the reference pattern via the read/write head assembly and to provide a corresponding series of digital samples. The sliding window phase calculator circuit is operable to receive a series of digital samples corresponding to a reference pattern that includes a periodic pattern and a mark pattern. The sliding window phase calculator circuit is operable to determine a phase select output based at least in part on samples of the periodic pattern included in a subset of the series of digital samples. The length of the sliding window corresponds to the number of digital samples included in the subset of the series of digital samples. The delay circuit is operable to delay the series of digital samples and to provide a series of delayed samples. The mark detector circuit interpolates the series of delayed samples using the phase select output to yield a series of interpolated samples, and to query the series of interpolated samples for the mark pattern.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 2a-2c graphically depict a spiral reference pattern in relation to tracks on a storage medium, and allows for discussion of the various embodiments of the present invention;

FIG. 3b is a timing diagram showing an exemplary operation of the spiral reference pattern detector of FIG. 3a;

DETAILED DESCRIPTION OF THE INVENTION

The present inventions are related to storage media, and more particularly to systems and methods for preparing servo data on a storage medium.

Various embodiments of the present invention provide systems and methods for accurately determining the location of an intersection of a traversal path with a reference pattern established on a storage medium. This location information may then be used to, for example, accurately define the write location of servo data associated with tracks on the storage medium. In some instances, one or more embodiments of the present invention provide for accurate detection of short sector address mark patterns included as part of the reference pattern. For example, one particular embodiment of the present invention provides for detection of a repeating sector address mark pattern that is preceded by as few as two to four periods of a preamble sequence. In some cases, multiple segments of preamble sequences may be used together to synchronize sampling of a sector address mark. In one particular case, a sliding discrete Fourier transform window is established defining a region over which the phase of the preamble sequences and sector address mark patterns is detected. As just some of many advantages, such embodiments may provide an increased ability to find all sector address marks occurring at the intersection of a spiral reference pattern and data track. Alternatively or in addition, such an approach may provide a reasonably accurate phase estimation at points across the intersection between the traversal path and the reference pattern. This phase estimate may be updated on a period by period basis where such is desired. Based upon the disclosure provided herein, one of ordinary skill in the art will recognize a variety of other advantages that may be achieved through use of different embodiments of the present invention.

Figure 1:
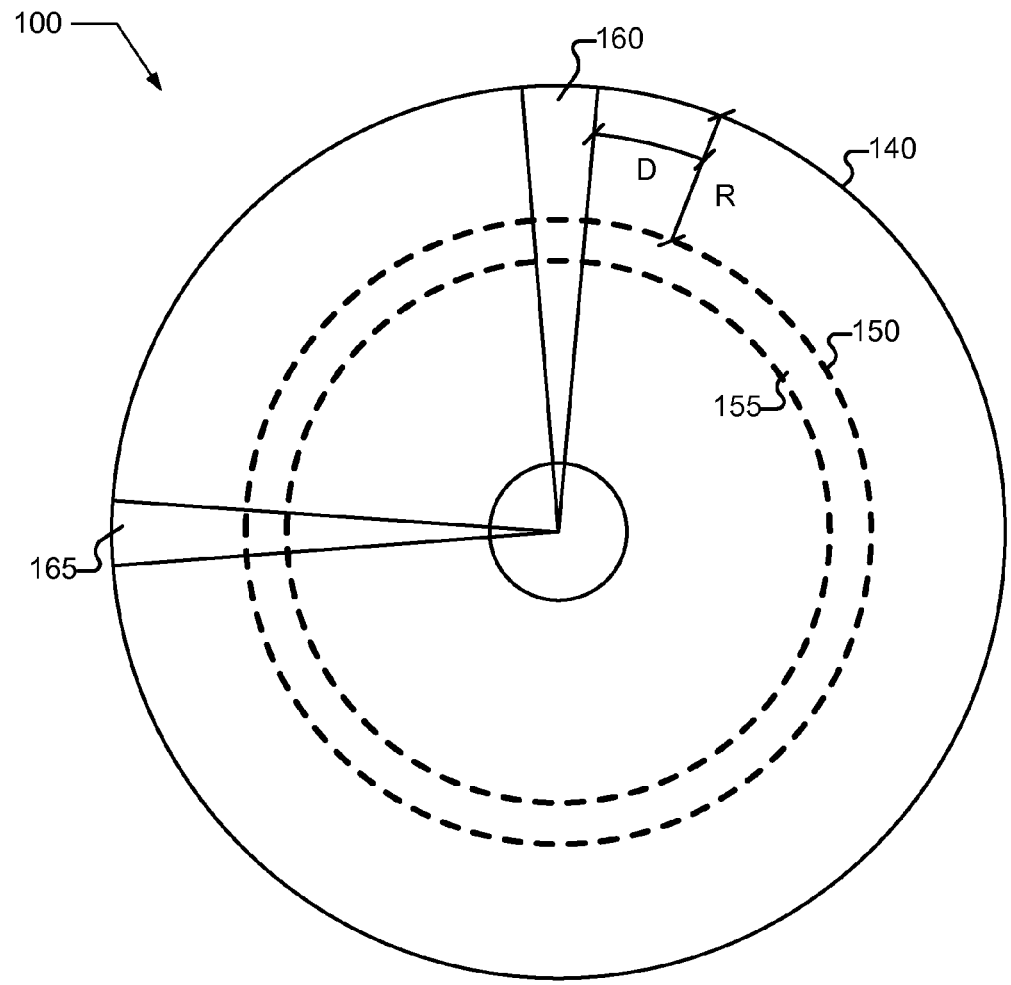
FIG. 1 depicts a known storage medium.
Figure 1:
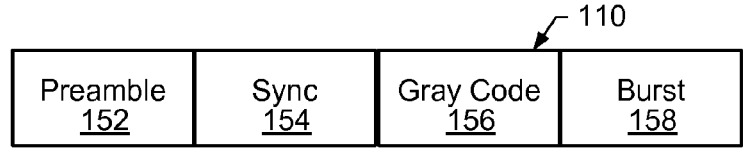
Figure 2A:
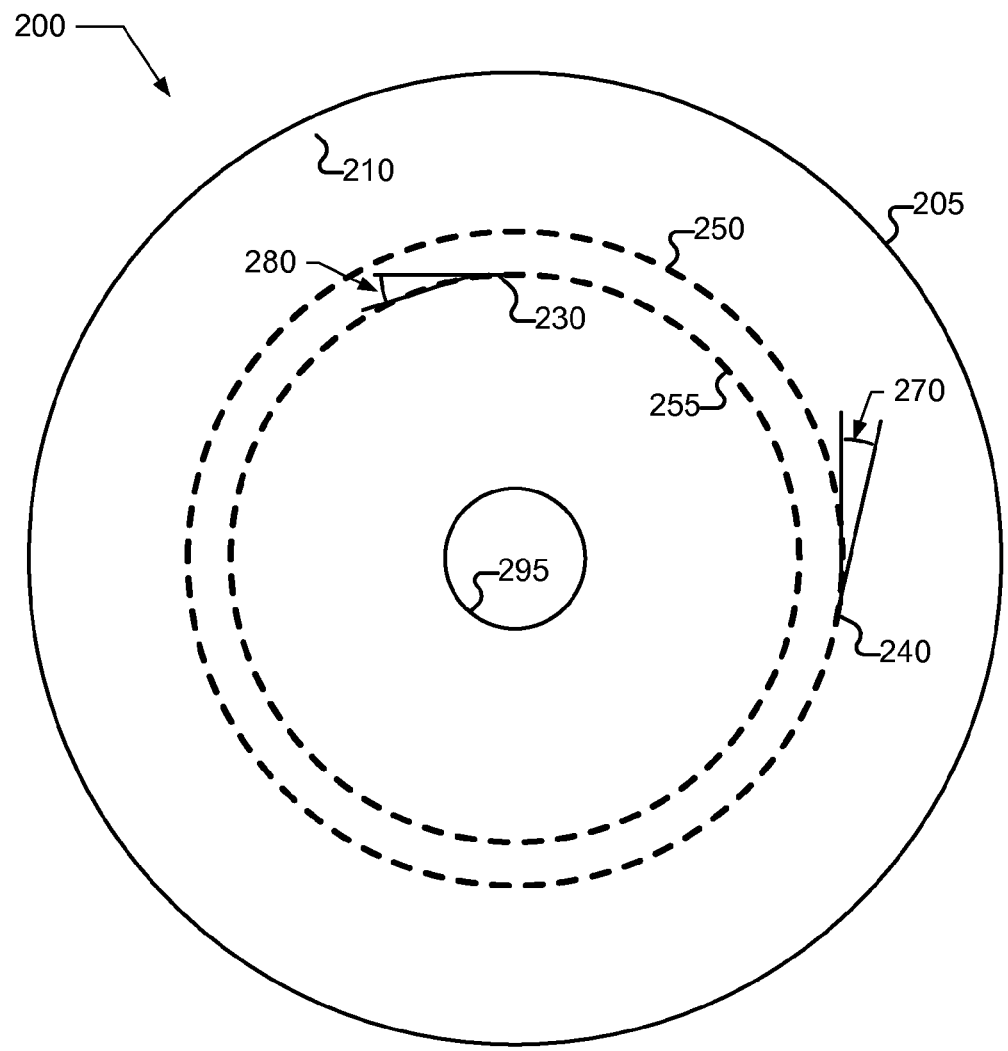
Figure 2B:
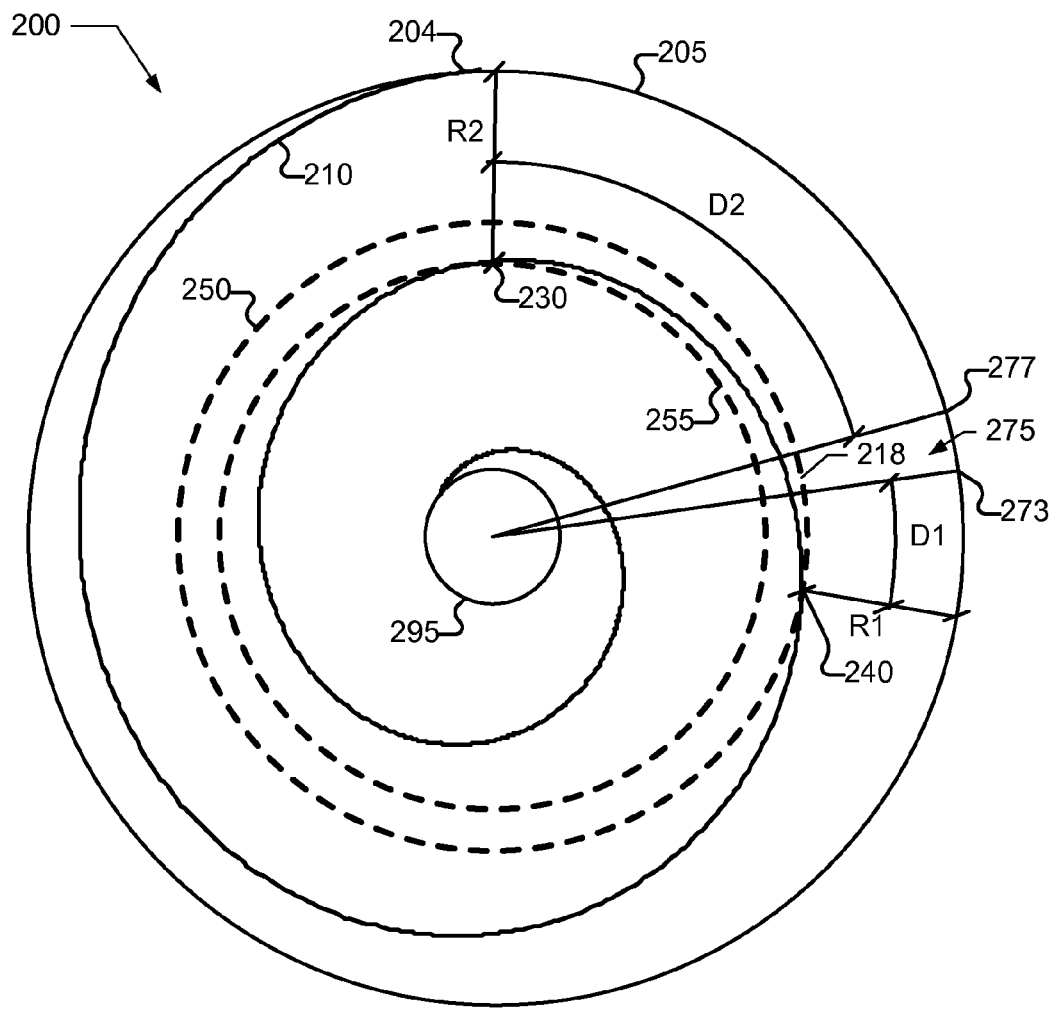

FIGS. 2a-2c graphically depict a spiral reference pattern in relation to tracks on a storage medium, and thereby provides an example in light of which the various embodiments of the present invention may be discussed. FIGS. 2a-2c and the discussion thereof are adapted from U.S. patent application Ser. No. 11/415,819 entitled "Systems and Methods for Estimating Time Corresponding to Peak Signal Amplitude" and filed by Annampedu et al. on May 1, 2006. The entirety of the aforementioned patent application is incorporated herein by reference for all purposes. Turning specifically to FIG. 2a, a storage medium 200 is depicted with a spiral reference pattern 210 formed thereon. In one particular case, spiral reference pattern 210 includes a repeating pattern of a preamble sequence and servo address mark. In addition, two tracks 250, 255 are also shown on storage medium 200 as dashed lines. Tracks 250, 255 may be formed as concentric circles on storage medium 200 at known distances from an outer edge 205 of storage medium 200. The data stored on storage medium 200 may be serially arranged along tracks 250, 255. It should be noted that a much larger number of tracks may be used in accordance with embodiments of the present invention and that the depiction of only two tracks is intended to simplify the description.

As shown, spiral reference pattern 210 extends in a smooth spiral shape from an outer edge 205 of storage medium 200 to an inner edge 295 of storage medium 200. In some cases, spiral reference pattern 210 is formed when the head of an external servo writer writes a repeating pattern as storage medium 200 is rotated at a constant rate and the head of the external servo writer is moved from outside edge 205 to inner edge 295 also at a constant rate. Using such an approach, any circumferential location along spiral reference pattern 210 is a function of distance from outer edge 205. Based on the disclosure provided herein, one of ordinary skill in the art will recognize other approaches that may be utilized for forming spiral reference pattern 210 on storage medium 200.

Track 250 intersects spiral reference pattern at a location 240, and an angle 270. Track 255 intersects spiral reference pattern 210 at a location 230, and an angle 280. The angle at which a track intersects spiral reference pattern 210 is a function of the number of revolutions included in spiral reference pattern from outer edge 205 to inner edge 295 and in some cases can be programmed at the time spiral reference pattern 210 is written on storage medium 200. As shown, spiral reference pattern 210 makes approximately two revolutions around storage medium 200 resulting in relatively large angles 270, 280. However, spiral reference pattern 210 is merely exemplary and it should be noted that spiral reference pattern 210 may make many more revolutions as it progresses from outer edge 205 to inner edge 295. This increase in revolutions results in a corresponding decrease in angles 270, 280. In some embodiments, the number of revolutions is high and the corresponding intersection angles are close to zero, but still non-zero.

Turning to FIG. 2b, an exemplary wedge 275 extending from an edge 273 to another edge 277 is included as part of storage medium 200. Wedge 275 can be one of many wedges distributed like spokes of a wheel across the circumference of storage medium 200. Wedge 275 may be written with a standard servo data pattern including a preamble, a sync, a gray code and a burst. In accordance with some embodiments of the present invention, this servo data pattern may be written at locations along particular tracks using spiral reference pattern 210 as a location guide. In particular, a location for servo data within wedge 275 may be defined as a distance, D1, from intersection point 240, or a distance, D2, from intersection point 230. In some cases, D1 and D2 are measured as times where storage medium 200 is rotated at a known rate.

In an exemplary operation, storage medium 200 is provided with spiral reference pattern 210 formed thereon. Storage medium 200 is installed in a disk drive that includes a read/write head assembly disposed near the surface of storage medium 200. Storage medium 200 is rotated in relation to the head assembly. As storage medium 200 rotates, the read/write head assembly traverses along a traversal path that intersects spiral reference pattern 210 at particular intersection locations depending upon the distance of head assembly from outer edge 205. By detecting the intersection location, the distance of the head assembly from outer edge 205 can be determined, along with a circumferential location relative to a starting point 204 of spiral reference pattern 210. Based on this information, the location of the read/write head assembly can be adjusted in relation to outer edge 205 such that it is disposed over a selected one of tracks 250, 255. In addition, storage medium 200 can be rotated such that the read/write head assembly is located at one of the edges 273, 277 of wedge 275. Thus, for example, where the servo data is to be written as part of track 255 at wedge 275, the head assembly can be positioned at edge 273 where it intersects track 255. From this location, storage medium 200 is rotated at a known rate such that the head assembly traverses a portion 218 of track 255. As the head assembly traverses portion 218, a modulating electric current is passed through the read/write head assembly causing the servo data to be written along portion 218. This process is repeated for the other wedges (not shown) that are distributed on the surface of storage medium 200, and for other tracks also distributed on the surface of storage medium 200.

FIG. 2c graphically depicts the intersection between spiral reference pattern 210 and a track along a traversal path 279. Traversal path 279 indicates the path traversed from right to left by the head assembly as storage medium 200 is rotated in relation thereto. As shown by traversal path 279, the head assembly begins to intersect spiral reference pattern 210 at an angle 271, and a location/time 212. At this point, the head assembly moving along traversal path 279 begins detecting spiral reference pattern 210, but the detected signal amplitude is relatively small due to the limited cross over between the head assembly and the spiral reference pattern. As the head assembly continues moving along traversal path 279, the cross over with spiral reference pattern 210 increases resulting in a corresponding increase in the detected signal amplitude. This increase in detected signal amplitude is graphically depicted as a region 229 of increasing amplitude of an overall detected signal pattern 219. The detected signal amplitude continues to increase until a location/time 222 where spiral reference pattern 210 is entirely under the head assembly. A transitional region 239 is traversed where the detected signal amplitude remains substantially constant. This continues until a location/time 232 where the head assembly begins to move away from spiral reference path 210. As the head assembly moves away from spiral reference path 210, the amplitude of the detected signal begins to decrease. This results in a region 249 of decreasing signal amplitude. Such a traversal of spiral reference pattern 210 along traversal path 279 results in a symmetry of overall detected signal pattern 219.

As will be appreciated by one of ordinary skill in the art based on the disclosure provided herein, the shape of overall detected signal pattern 219 may be changed where one, or more variables are modified. The depicted "submarine" shape may assume more of "football shape" or more of a "diamond" shape or "elongated diamond" shape as one or more variables is/are modified. For example, where intersection angle 271 is increased, the length of time that the head spends traversing spiral reference pattern 210 decreases causing the rate of the increase in amplitude at region 229 and the rate of decrease in amplitude at region 249 to accelerate. In addition, the length of transitional region 239 decreases. In some cases, the length of transitional region 239 is reduced to zero. In such cases, transitional region 239 is an immediate transition of zero length from an area of increasing amplitude to an area of decreasing amplitude. As another example, where the area that is detectable by the head assembly is narrowed (i.e., traversal path 279 is narrower), the length of overall detected signal pattern 219 is decreased. Further, it should be noted that overall detected signal pattern 219 is shown with exemplary repetition of the signal written as part of spiral reference pattern 210, but that many more repetitions are common within region 229 and region 249. Thus, where approximately two peaks are shown in each of regions 229, 249, an actual detected signal may include ten or more peaks within each region.

Figure 3A:
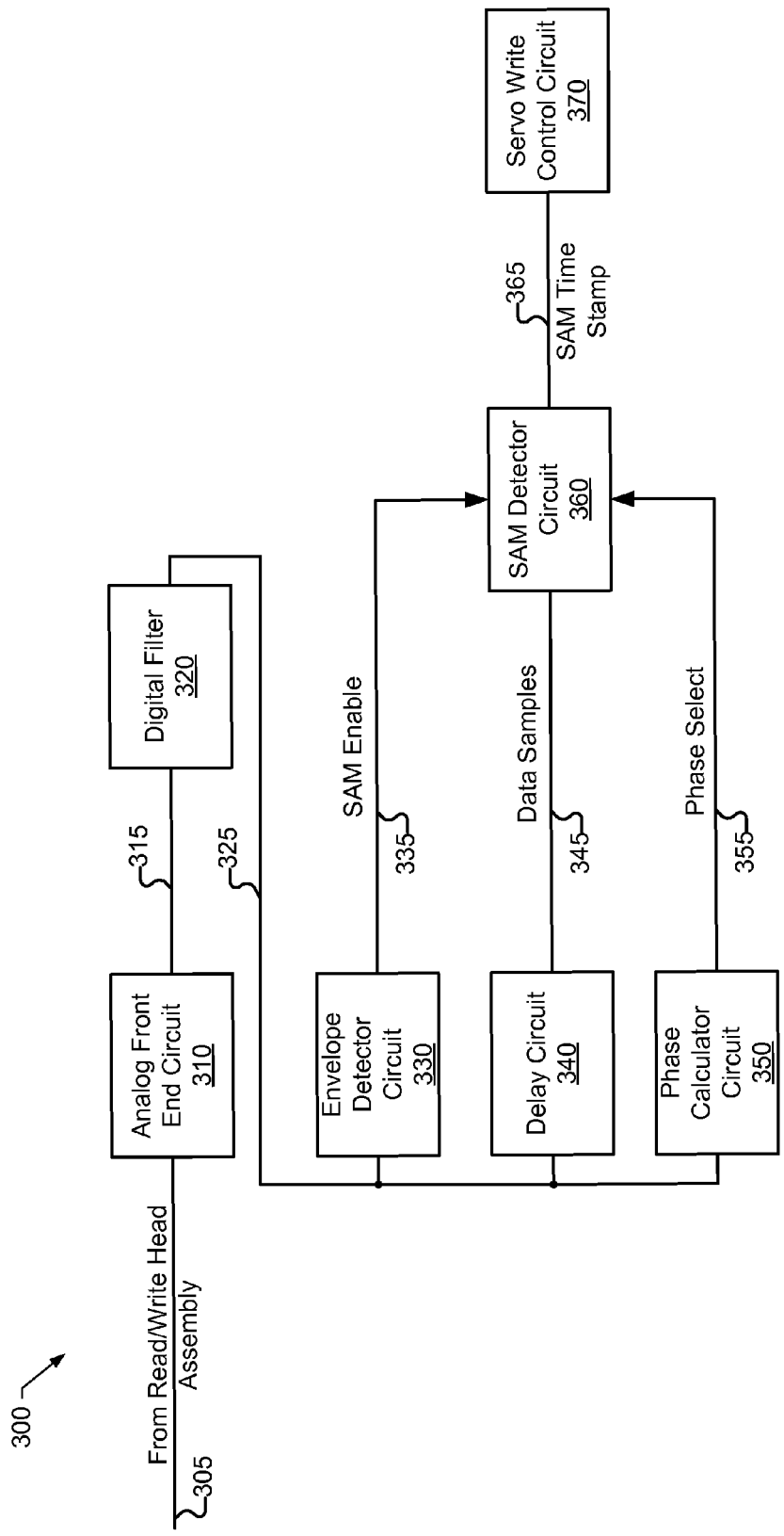
FIG. 3a depicts a spiral reference pattern detector circuit in accordance with one or more embodiments of the present invention.

Turning to FIG. 3, a reference pattern detector circuit 300 is depicted in accordance with one or more embodiments of the present invention. Reference pattern detector circuit 300 includes an analog front end circuit 310 that receives an analog signal 305 and provides a corresponding digital signal 315. Analog front end circuit 310 may include any circuitry known in the art that is capable of receiving an analog input signal and providing a corresponding digital signal. In one particular instance, analog front end circuit 310 includes an amplifier that receives and amplifies input analog signal 305, an analog filter that reduces any noise exhibited at the output of the amplifier, and an analog to digital converter that receives the filtered signal and provides a series of digital samples corresponding to the magnitude of the filtered signal at defined sampling points. Based upon the disclosure provided herein, one of ordinary skill in the art will recognize a variety of circuitry that may be included in analog front end circuit 310 in accordance with different embodiments of the present invention.

Digital signal 315 is provided to a digital filter 320 that provides a corresponding filtered output 325. In one particular embodiment of the present invention, digital filter 320 is a finite impulse response filter as are known in the art. Filtered output 325 is provided in parallel to an envelope detector circuit 330, a delay circuit 340 and a sliding window phase calculator circuit 350. Envelope detector circuit 330 provides a SAM enable signal 335 to a SAM detector circuit 360 that is asserted high whenever envelope detector circuit 330 determines that the amplitude of filtered output 325 is sufficiently high to warrant reliance on information received. Said another way with reference to FIG. 2c, envelope detector circuit 330 is operable to determine whether traversal path 279 has sufficiently crossed spiral reference pattern 210 such that the amplitude of overall detected signal pattern 219 is sufficiently large to be reliably used for performing synchronization on the preamble sequences and sector address marks.

In some cases, envelope detector circuit 330 is a running summation circuit where a defined number of absolute value samples provided as part of filtered output 325 are summed together, and the sum is compared with a programmable threshold value. In one particular instance of the aforementioned embodiment, the running summation circuit includes a forty stage FIFO register that continuously receives the samples received as part of filtered output 325 such that the stages of the FIFO register hold the forty most recent samples of filtered output 325. The output of each stage of the FIFO register is provided to a summation circuit that sums the forty values. The sum of the forty values is provided to a comparator circuit that compares the sum with a threshold value from a programmable threshold register. When the sum exceeds the programmable threshold value, SAM enable signal 335 is asserted high. It should be noted that other threshold detector circuits operable to determine that the amplitude of filtered output has become sufficiently high may be used in relation to different embodiments of the present invention.

Sliding window phase calculator circuit 350 receives filtered output 325 and continuously calculates the phase and frequency of the preamble sequences and/or sector address mark patterns represented by filtered output 325. Referring to FIG. 2c, sliding window phase calculator circuit 350 continuously calculates the frequency and phase of overall detected signal pattern 219. In some embodiments of the present invention, sliding window phase calculator circuit 350 is implemented as a sliding window discrete Fourier transform circuit where a discrete Fourier transform is applied to a defined number of consecutive samples received as filtered output 325. In one particular instance, the sliding window is forty samples. In such cases, sliding window phase calculator circuit 350 provides a phase select output 355 that is used by SAM detector circuit 360.

Delay circuit 340 delays filtered output 325 by a number of periods approximately equal to one half of the length of the window used by phase calculator circuit 350. Delayed filtered output 325 is provided as data samples 345 to SAM detector circuit 360. In one particular implementation, the delay implemented by delay circuit 340 may be between forty percent and sixty percent of the number of periods covered by the window of sliding window phase calculator circuit 350. As an example, where the window is forty samples, delay circuit 340 may implement a delay between sixteen and twenty-four periods. In another particular implementation, the delay implemented by delay circuit 340 may be between forty-five percent and fifty-five percent of the number of periods covered by the window of sliding window phase calculator circuit 350. As an example, where the window is forty samples, delay circuit 340 may implement a delay between eighteen and twenty-two periods. In yet another particular implementation, the delay implemented by delay circuit 340 may be exactly fifty percent of the number of periods covered by the window of sliding window phase calculator circuit 350. As an example, where the window is forty samples, delay circuit 340 may implement a delay of exactly twenty periods.

SAM detector circuit 360 interpolates data samples 345 to the phase indicated by phase select output 355, and continuously queries the interpolated data samples looking for a sector address mark pattern (i.e., a SAM). Thus, for example, where the sector address mark pattern is a '11000011' pattern, SAM detector circuit 360 queries the interpolated data samples looking for the '11000011' pattern. When the sector address mark pattern is identified, a SAM found signal is asserted and a location stamp is associated with the SAM found signal, but the location stamp is not provided as SAM location stamp 365 unless SAM enable 335 is asserted high. Only when a sector address mark is identified and SAM enable 335 is asserted high is a SAM location stamp 365 provided to a servo write control circuit 370. As used herein, the phrases "SAM location stamp", "location stamp", or "location mark" are used in their broadest sense to mean any value corresponding to a location on a storage medium where a mark pattern, such as a sector address mark is written. Thus, for example, a SAM location stamp may be a time offset from a fixed point on the storage medium. As another example, a SAM location stamp may be a number of counts of a counter from a fixed location on the storage medium. As such, the SAM location stamp identifies a distinct location on the storage medium. Based upon the disclosure provided herein, one of ordinary skill in the art will recognize a variety of values that may be used as a SAM location stamp to identify a particular location on the storage medium.

In some cases, SAM detector circuit 360 may generate multiple SAM location stamps during each intersection of a spiral reference pattern. As an example, between three to five SAM location stamps may be detected with each corresponding to a uniquely identified sector address mark occurring at the intersection with the spiral reference pattern. In such a case, servo write control circuit 370 would select one of the identified SAM location stamps as a reference point from which the location of subsequent servo data will be written to the storage medium. For example, where three SAM location stamps 365 corresponding to an intersection with the spiral reference pattern are provided to servo write control circuit 370, the middle SAM location stamp of the three SAM location stamp may be chosen as the reference point. As another example, where four SAM location stamps 365 corresponding to an intersection with the spiral reference pattern are provided to servo write control circuit 370, the second and third (i.e., the middle two SAM location stamps) may be averaged and the average location chosen as the reference point. Based upon the disclosure provided herein, one of ordinary skill in the art will recognize a variety of approaches that may be used to select one or a combination of two or more SAM location stamps as a reference point. Servo write control circuit 370 proceeds to write servo data to the storage medium at a location offset from the established reference point. The servo data pattern that is written may be any servo data pattern known in the art, and the process of writing the servo data to the storage medium may be done using any storage media write process known in the art.

Figure 3B:
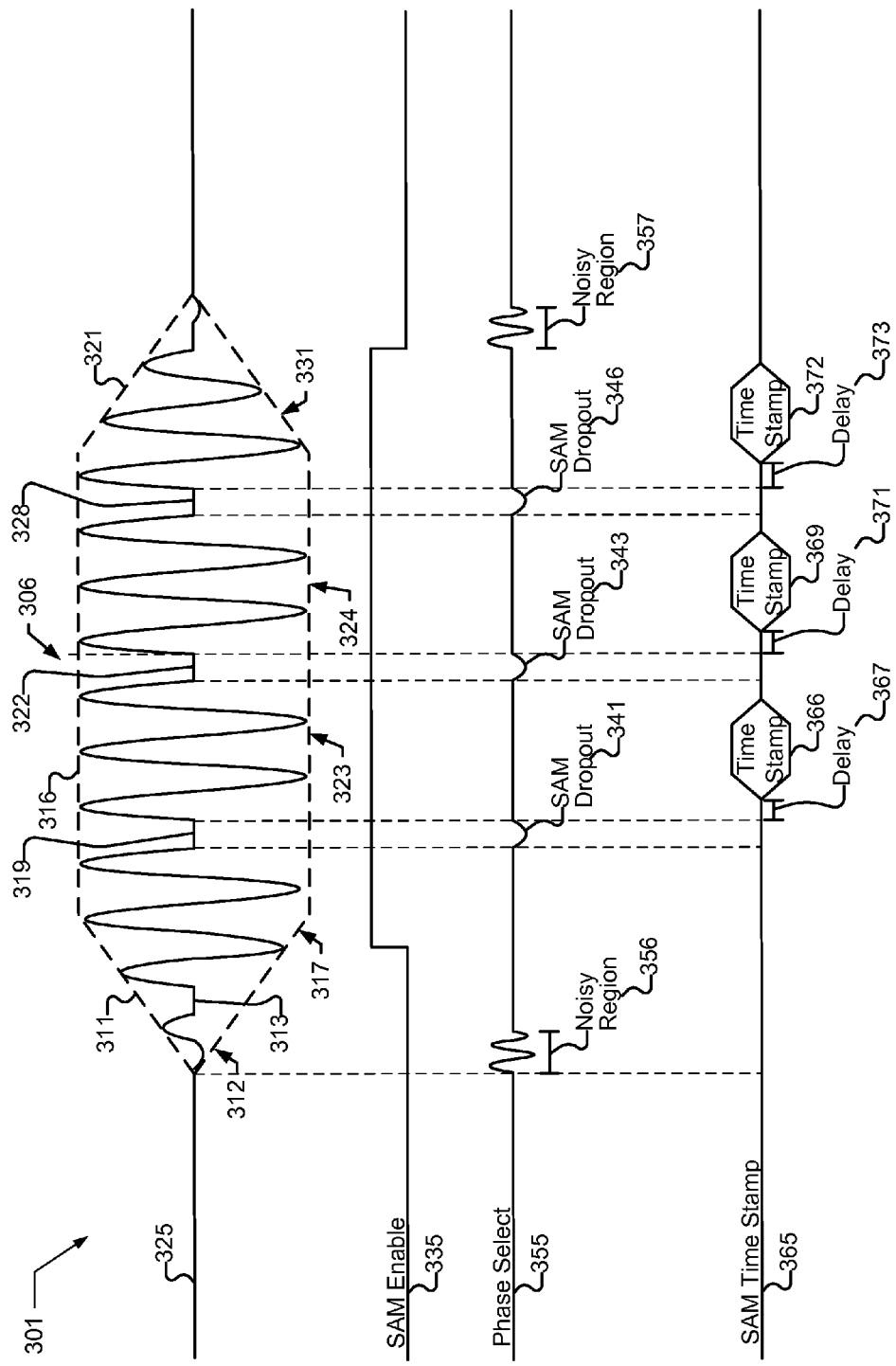

Operation of reference pattern detector circuit 300 is described in more detail with reference to a timing diagram 301 of FIG. 3*b*. Timing diagram 301 is a representation of filtered output 325 that is a series of digital values. It should be noted that the series of digital samples are represented as a continuous waveform 306 when in fact they are a series of non-continuous digital values. In one particular embodiment of the present invention, four digital samples are taken during each period (T) of waveform 306. Thus, the depicted continuous waveform 306 represents the increase and decrease of the eight sample values across each period. As shown, waveform 306 increases in amplitude over a transition period that corresponds to the time that the read/write head assembly is moving over the spiral reference pattern. During the transition period of increasing amplitude, there are two distinct preamble sequences 312, 317 interspersed with a sector address mark pattern 313. Eventually, the read/write head assembly is fully over the spiral reference pattern such that the amplitude of waveform 306 is maximized. As shown, during the period of maximized amplitude, three sector address mark patterns 319, 322, 328 occur with preamble sequences 323, 324 spaced between the aforementioned sector address mark patterns. As the read/write head begins to move away from the spiral reference pattern, the amplitude of waveform 306 begins decreasing until it is finally zero. During this transition period of decreasing amplitude, a preamble sequence 331 followed by a sector address mark pattern 329 occurs. It should be noted that waveform 306 is merely exemplary and that the number of sector address marks and interspersed preamble sequences will vary depending upon the length of the preamble sequences and sector address mark patterns and the angle at which the read/write head intersects the spiral reference pattern. Further, it should be noted that any preamble sequence and/or sector address mark pattern may be used in relation to the various embodiments of the present invention.

As shown, SAM enable signal 335 is asserted high sometime after the period of increasing amplitude of waveform 306 begins. The assertion of SAM enable signal 335 occurs once the amplitude of waveform 306 reaches a programmable threshold level. This may be done by simply comparing the peak of waveform 306 with a threshold value, or where it is desired to provide some immunity to noise an envelope detector such as envelope detector circuit 330 may be used. In the depicted case, assertion of SAM enable signal 335 occurs a first period after the start of the transition period of increasing amplitude, and de-assertion of SAM enable signal 335 occurs a second period before the end of the transition period of decreasing amplitude. Where an envelope detector is used, such as envelope detector circuit 330, the first period is longer than the second period consistent with the depiction in timing diagram 301.

As shown, phase select output 355 from phase calculator circuit 350 is substantially stable when the amplitude of the received signal is largely constant (i.e., when the read/write head assembly has not yet intersected the spiral reference pattern). Phase select output 355 becomes noisy during a noisy region 356 that corresponds to the time when the read/write head assembly begins intersecting the spiral reference pattern. During this time period, phase select output 355 is making dramatic changes as an attempt is made to lock on to the phase of waveform 306. At some point, phase calculator circuit 350 locks onto the phase of waveform 306 and phase select output 355 stabilizes. Phase select output 355 may change slightly during periods corresponding to sector address mark patterns 313, 319, 322, 328 as such patterns may not have the same detectable periodicity of the interspaced preamble sequences 317, 323, 324, 331. The regions corresponding to the sector address mark patterns 319, 322, 328 are respectively labeled SAM dropout 341, SAM dropout 343, SAM dropout 348. As the read/write head assembly begins moving away from the spiral reference pattern, the periodicity of filtered output 325 changes resulting in a noisy region 357.

As shown, SAM location stamp 365 provides a location stamp 366 to downstream servo write control circuit 370. Location stamp 366 corresponds to the detected location of sector address mark 319 shifted in time by a delay. The delay corresponds to the delay imposed by delay circuit 340. In addition, SAM location stamp 365 provides a location stamp 369 to downstream servo write control circuit 370. Location stamp 369 corresponds to the detected location of sector address mark 322 shifted in time by a delay. Again, the delay corresponds to the delay imposed by delay circuit 340. Further, SAM location stamp 365 provides a location stamp 372 to downstream servo write control circuit 370. Location stamp 372 corresponds to the detected location of sector address mark 328 shifted in time by a delay. Again, the delay corresponds to the delay imposed by delay circuit 340.

As previously explained, servo write control circuit 370 may use one of location stamps 366, 369, 372 as a reference point corresponding to the location of the spiral reference pattern. In some cases, a refined selection may select the center location stamp (in this case, location stamp 369) as the reference point. In other cases, two or more of location stamps may be averaged together to yield the reference point. In one particular case, all of the location stamps may be averaged to yield the reference point.

Figure 4:
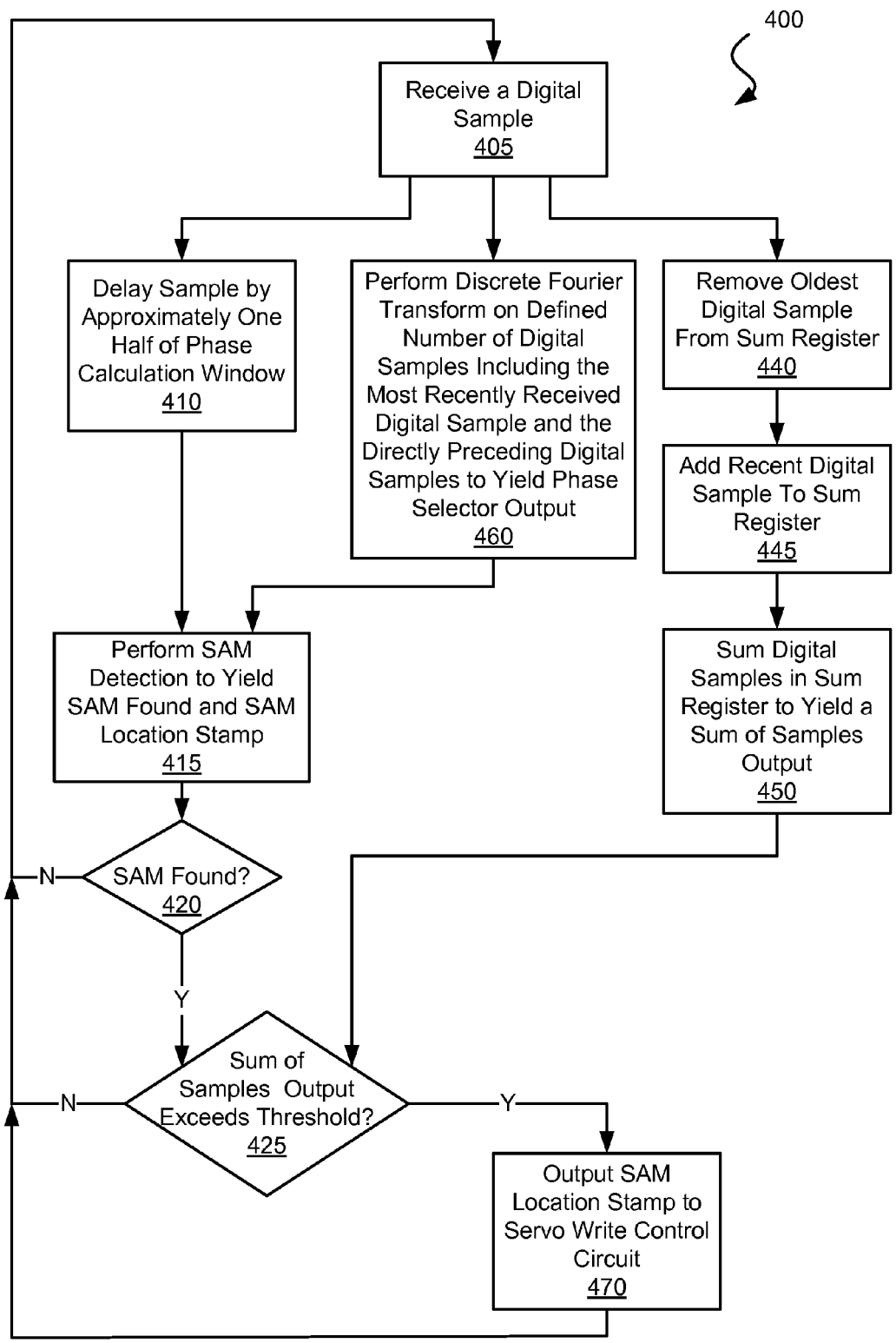
FIG. 4 is a flow diagram showing a method in accordance with various embodiments of the present invention for locating a spiral reference pattern.

Turning to FIG. 4, a flow diagram 400 shows a method in accordance with various embodiments of the present invention for locating a spiral reference pattern. Following flow diagram 400, a digital sample is received (block 405). The received digital sample may be, for example, one of a series of digital samples that are received as part of filtered output 325. The oldest maintained digital sample is removed from a sum register to make room for the newly received digital sample (block 440), and the newly received digital sample is added to the sum register (block 445). In some cases, the sum register is implemented as a FIFO register capable of holding a predetermined number of the most recent digital samples. Next, a subset of the digital samples maintained in the sum register are added together to yield a sum of samples (block 450). In some embodiments, the subset incorporated to yield the sum of samples includes the most recently received digital samples. In such an implementation, the sum of samples is recalculated for a sliding window that progressively moves along (i.e., slides) a series of digital samples as each new digital sample is received. The series of input data samples may be represented, for example, as filtered output 325 of FIG. 3b.

In parallel with summing across the sliding window of the received digital samples (blocks 440, 445, 450), a discrete Fourier transform of a defined number of the most recently received digital samples is performed (block 460). In some cases, such a discrete Fourier transform may be applied to a subset of the digital samples including the most recent digital samples that are maintained in the sum register. The discrete Fourier transform transforms the continuous function represented by the filtered output that exists in the time domain into the frequency domain from which phase and frequency of the received series of digital samples are derived. The discrete Fourier transform operates over a finite number of the series of digital samples included within a sliding window that progressively moves along a series of digital samples as each new digital sample is received. The result of the discrete Fourier transform is a phase selector output that indicates the phase and frequency of the series of digital samples.

The received digital samples (block 405) are delayed in time (block 410). In one particular embodiment of the present invention, the delay is approximately one half of the periods represented by the length of the sliding window used in relation to the discrete Fourier transform of block 460. Thus, for example, if the discrete Fourier transform operates on the forty most recent digital samples (i.e., the length of the sliding window), then in this particular case the delay would be about twenty periods where one digital sample is received on each of the twenty periods. Based upon the disclosure provided herein, one of ordinary skill in the art will recognize other delay periods that may be used in relation to different embodiments of the present invention.

The phase select developed by the discrete Fourier transform (block 460) is used to interpolate the delayed digital samples such that the digital samples more closely represent the digital value at the correct sampling frequency and phase (block 415). The interpolated digital samples are queried to determine whether a sector address mark pattern has occurred (block 420). Where a sector address mark is not found (block 420), the processes of blocks 405, 410, 415, 440, 445, 450, 460 are repeated upon receiving the next digital sample. Alternatively, where a sector address mark is found (block 420), it is determined whether the sum of samples value from block 450 exceeds a programmable threshold (block 425). Where the threshold is not exceeded (block 425), the processes of blocks 405, 410, 415, 420, 440, 445, 450, 460 are repeated upon receiving the next digital sample. Alternatively, where the threshold is exceeded (block 425) a SAM location stamp indicating the location of the identified sector address mark pattern is generated and provided to a servo write control circuit (block 470). Once this is complete, the processes of blocks 405, 410, 415, 420, 425, 440, 445, 450, 460, 470 are repeated upon receiving the next digital sample.

Figure 5:
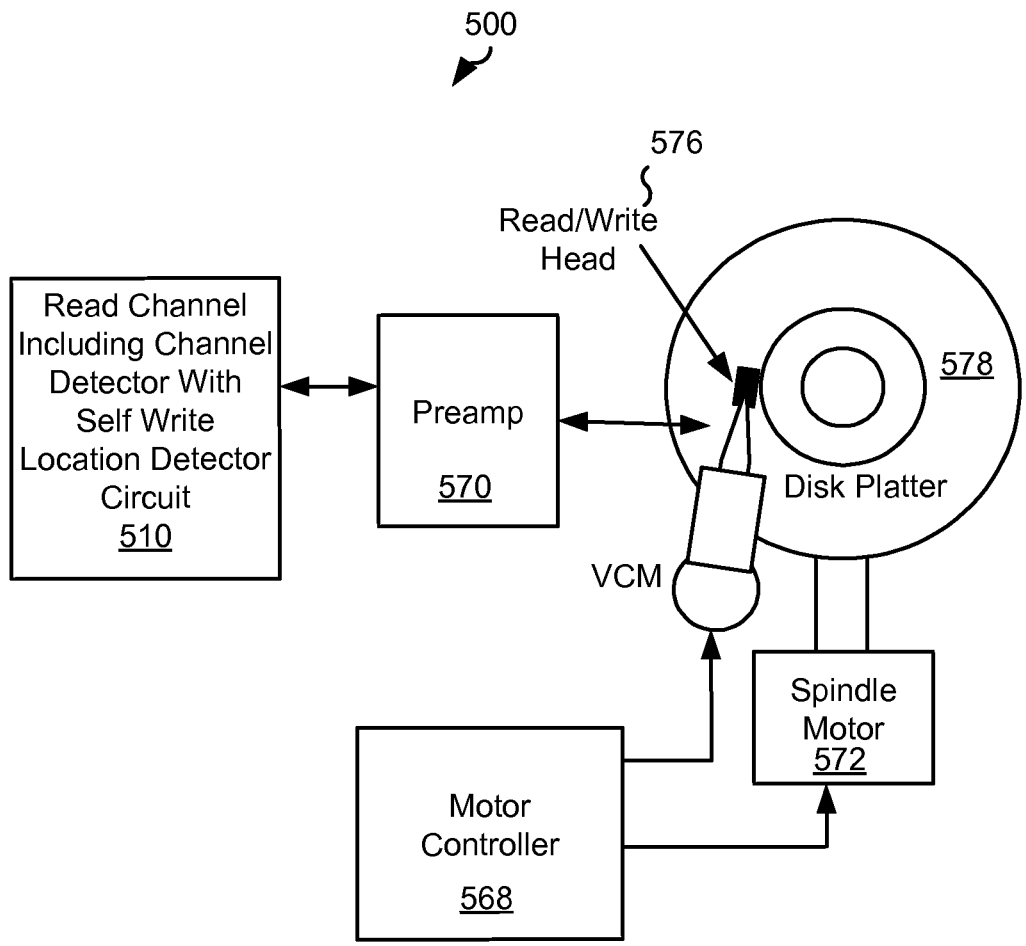
FIG. 5 shows a storage system including a channel detector with a self write location detector circuit in accordance with various embodiments of the present invention.

Turning to FIG. 5, a storage system 500 including read channel circuit 510 with a self write location detector circuit is shown in accordance with various embodiments of the present invention. Storage system 500 may be, for example, a hard disk drive. The self write location detector circuit included in read channel circuit 510 may be, but is not limited to, a processing circuit similar to that discussed above in relation to FIGS. 3a and 3b. In some cases, the self write location circuit may operate similar to that discussed above in relation to FIG. 4.

Storage system 500 also includes a preamplifier 570, an interface controller 520, a hard disk controller 566, a motor controller 568, a spindle motor 572, a disk platter 578, and a read/write head assembly 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with a perpendicular recording scheme. For example, the magnetic signals may be recorded as either longitudinal or perpendicular recorded signals.

In a typical self write operation, read/write head assembly 776 traverses above the surface of disk platter 778 under the control of motor controller 768 and spindle motor 572 that rotates disk platter at a known rate. Any spiral reference pattern previously written on disk platter 578 is detected by read/write head assembly 776, and an electrical signal corresponding to the detected pattern is provided to preamplifier 570. Preamplifier 570 amplifies the received signal and provides the amplified signal to read channel circuit 510. As data is received by read channel circuit 510, it is determined whether a spiral reference pattern is detected and whether a sector address mark of the spiral reference pattern is detected. Any detected sector address mark patterns are used to fix a location that will be the bases of subsequently written servo data fields. Thus, when a location of the spiral reference pattern is fixed using the detected sector address marks, a counter is started that tracks a distance from the located spiral reference pattern. After a determined distance, read/write head assembly 776 begins writing the desired servo data at the defined distance from the detected spiral reference pattern. This process is continued until all of the desired servo data fields are written.

In conclusion, the invention provides novel systems, devices, methods and arrangements for locating a spiral reference pattern on a storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for locating a reference pattern on a storage medium, the system comprising:
   a sliding window phase calculator circuit, wherein the sliding window phase calculator circuit is operable to receive a series of digital samples corresponding to a reference pattern including a periodic pattern and a mark pattern, wherein sliding window phase calculator circuit is operable to determine a phase select output based at least in part on samples of the periodic pattern included in a subset of the series of digital samples; and wherein the length of the sliding window corresponds to the number of digital samples included in the subset of the series of digital samples;
   a delay circuit, wherein the delay circuit is operable to delay the series of digital samples and to provide a series of delayed samples; and
   a mark detector circuit, wherein the mark detector circuit interpolates the series of delayed samples using the phase select output to yield a series of interpolated samples, and wherein the mark detector circuit is operable to query the series of interpolated samples for the mark pattern; and wherein the delay imposed by the delay circuit is selected from a group consisting of: approximately one half of the number of periods corresponding to the number of samples in the subset of the series of digital samples, and exactly one half of the number of periods corresponding to the number of samples in the subset of the series of digital samples.

2. The system of claim 1, wherein the sliding window phase calculator circuit includes a discrete Fourier transform circuit, and wherein the discrete Fourier transform circuit is operable to transfer the subset of the series of digital samples from the time domain to the frequency domain.

3. The system of claim 1, wherein the subset of the series of digital samples is a first subset of the series of digital samples, and wherein the system further comprises:
a threshold detection circuit, wherein the threshold detection circuit is operable to assert an enable signal when a second subset of the series of digital samples exceeds a threshold value.

4. The system of claim 3, wherein the mark detector circuit is further operable to provide a location mark when the mark pattern is detected and the enable signal is asserted.

5. The system of claim 3, wherein the threshold detection circuit is an envelope detector circuit.

6. The system of claim 1, wherein the system is implemented in an integrated circuit.

7. The system of claim 1, wherein the system is implemented as part of a storage device.

8. A method for determining a location of a reference pattern on a storage medium, the method comprising:
receiving a series of digital samples corresponding to a reference pattern on a medium, wherein the reference pattern includes a periodic pattern and a mark pattern;
performing a discrete Fourier transform on a subset of the series of digital samples to yield a phase of the periodic pattern;
interpolating a subset of the series digital samples using the phase of the periodic pattern to yield an interpolated series of digital samples, wherein the subset of the series of digital samples are defined by a window of a defined length, and wherein the subset of the series of digital samples is a first subset of the series of digital samples;
searching the interpolated series of digital samples for the mark pattern, wherein a location of the detected mark pattern is identified the mark pattern is detected
adding an additional digital sample to the series of digital samples;
sliding the window across the series of digital samples to yield a second subset of the series of digital samples that includes the additional digital sample;
summing the absolute values of each of the second subset of digital samples to yield a sum of samples; and
comparing a derivative of the sum of samples with a threshold value, wherein an enable signal is asserted when the sum of samples exceeds the threshold value.

9. The method of claim 8, wherein the mark pattern is a sector address mark pattern.

10. The method of claim 8, wherein the window includes the forty most recent instances of the series of digital samples.

11. The method of claim 8, wherein the location of the detected mark pattern is provided when the enable signal is asserted.

12. The method of claim 8, wherein the location of the detected mark pattern is detected a number of periods after the series of digital samples surrounding the mark pattern are used to perform the discrete Fourier transform.

13. The method of claim 12, wherein the number of periods corresponds to approximately one half of the length of the window.

14. The method of claim 12, wherein the number of periods corresponds to exactly one half of the length of the window.

15. The method of claim 8, wherein the location of the detected mark pattern is provided to a servo write control circuit operable to write servo data on the medium.

16. The method of claim 15, wherein the servo data is written to the storage medium at a location a defined distance from the location of the detected mark pattern.

17. A storage system, the storage system comprising:
a storage medium including a reference pattern having a periodic pattern and a mark pattern.
a read/write head assembly disposed in relation to the storage medium;
an analog to digital conversion circuit, wherein the analog to digital conversion circuit is operable to receive an electrical signal corresponding to the reference pattern via the read/write head assembly and to provide a corresponding series of digital samples;
a location detector circuit, wherein the location detector circuit includes:
a sliding window phase calculator circuit, wherein the sliding window phase calculator circuit is operable to receive a series of digital samples corresponding to a reference pattern including a periodic pattern and a mark pattern, wherein sliding window phase calculator circuit is operable to determine a phase select output based at least in part on samples of the periodic pattern included in a subset of the series of digital samples; and wherein the length of the sliding window corresponds to the number of digital samples included in the subset of the series of digital samples;
a delay circuit, wherein the delay circuit is operable to delay the series of digital samples and to provide a series of delayed samples;
a mark detector circuit, wherein the mark detector circuit interpolates the series of delayed samples using the phase select output to yield a series of interpolated samples, and wherein the mark detector circuit is operable to query the series of interpolated samples for the mark pattern; and
wherein the delay imposed by the delay circuit is selected from a group consisting of: approximately one half of the number of periods corresponding to the number of samples in the subset of the series of digital samples, and exactly one half of the number of periods corresponding to the number of samples in the subset of the series of digital samples.

18. The system of claim 17, wherein the sliding window phase calculator circuit includes a discrete Fourier transform circuit, and wherein the discrete Fourier transform circuit is operable to transfer the subset of the series of digital samples from the time domain to the frequency domain.

* * * * *